United States Patent [19]

Kostek et al.

[11] Patent Number: 5,309,404
[45] Date of Patent: May 3, 1994

[54] RECEIVER APPARATUS FOR USE IN LOGGING WHILE DRILLING

[75] Inventors: Sergio Kostek, Ridgefield; Thomas J. Plona, New Milford; Shu-Kong Chang, West Redding, all of Conn.

[73] Assignee: Schlumberger Technology Corporation, New York, N.Y.

[21] Appl. No.: 722,321

[22] Filed: Jun. 28, 1991

Related U.S. Application Data

[63] Continuation-in-part of Ser. No. 548,169, Jul. 5, 1990, abandoned, which is a continuation-in-part of Ser. No. 288,742, Dec. 22, 1988, abandoned.

[51] Int. Cl.[5] .............................................. G01V 1/40
[52] U.S. Cl. ........................................ 367/31; 367/35; 367/75; 367/911; 181/105
[58] Field of Search ....................... 367/31, 35, 75, 911, 367/25, 155, 157, 912; 381/71; 181/104, 105, 112, 106; 175/50; 73/152

[56] References Cited

U.S. PATENT DOCUMENTS

| | | | |
|---|---|---|---|
| Re. 33,472 | 12/1990 | Chung et al. | 367/31 |
| 2,350,371 | 6/1944 | Smith . | |
| 2,757,358 | 7/1956 | Ely . | |
| 2,788,510 | 4/1957 | Howes . | |
| 3,054,471 | 9/1962 | Knudsen . | |
| 3,063,035 | 11/1962 | Voget et al. . | |
| 3,093,810 | 6/1963 | Gever et al. . | |
| 3,136,381 | 6/1964 | Anderson . | |
| 3,144,090 | 8/1964 | Mazzagatti et al. . | |
| 3,161,256 | 12/1964 | Pardue . | |
| 3,190,388 | 6/1965 | Moser et al. . | |
| 3,191,141 | 6/1965 | Schuster . | |
| 3,191,142 | 6/1965 | Lebourg . | |
| 3,191,143 | 6/1965 | Pardue . | |
| 3,213,415 | 10/1965 | Moser et al. . | |
| 3,244,253 | 4/1966 | Blizard | 367/912 |
| 3,271,733 | 9/1966 | Cubberly, Jr. . | |
| 3,288,245 | 11/1966 | Anderson . | |
| 3,364,463 | 1/1968 | Pardue . | |
| 3,381,267 | 4/1968 | Cubberly, Jr. et al. . | |
| 3,493,921 | 2/1970 | Johns . | |
| 3,504,757 | 4/1970 | Chapman, III . | |
| 3,608,373 | 9/1971 | Youmans . | |
| 3,697,937 | 10/1972 | Ingram | 367/25 |
| 3,860,928 | 1/1975 | Ehrlich | 73/570 |
| 3,982,606 | 9/1976 | Berry et al. . | |
| 4,020,452 | 4/1977 | Trouiller et al. . | |
| 4,420,826 | 12/1983 | Marshall et al. | 367/167 |
| 4,477,783 | 10/1984 | Glenn | 367/155 |
| 4,594,691 | 6/1986 | Kimball et al. . | |
| 4,685,091 | 8/1987 | Chung et al. | 367/31 |
| 4,698,792 | 10/1987 | Kurkjian et al. | 367/31 |
| 4,703,460 | 10/1987 | Kurkjian et al. | 367/31 |
| 4,832,148 | 5/1989 | Becker et al. | 181/104 |
| 4,951,267 | 8/1990 | Chang et al. | 367/31 |
| 5,027,331 | 6/1991 | Winbow et al. | 367/75 |

*Primary Examiner*—Nelson Moskowitz
*Attorney, Agent, or Firm*—Leonard W. Pojunas; Marc D. Foodman

[57] ABSTRACT

An apparatus for reducing or eliminating the effects of a quadrupole component of an acoustic signal received from a transversely mounted acoustic source in a drill collar of a logging while drilling tool. The apparatus includes a drill collar for supporting a drill bit, a transversely mounted transmitter situated in a first horizontal plane in the drill collar which transmits acoustic energy into an earth formation. The drill collar also houses at least one receiver mounted in a second horizontal plane in the drill collar at an angular displacement from the transmitter such that the effects of a quadrupole component of the acoustic energy detected by the receiver are rendered insignificant.

20 Claims, 9 Drawing Sheets

RECEIVER APPARATUS FOR USE IN LOGGING WHILE DRILLING

CROSS-REFERENCE TO RELATED APPLICATIONS

This application is a continuation-in-part of Ser. No. 07/548,169, filed Jul. 5, 1990, now abandoned, which is a continuation-in-part of Ser. No. 288,742 filed Dec. 22, 1988, now abandoned.

BACKGROUND OF THE INVENTION

The present invention relates generally to logging-while-drilling tools in the borehole logging industry. More particularly, the invention relates to sonic logging-while-drilling receivers and their configuration in a drill collar.

Research and development in the field of sonic logging-while-drilling has resulted in the transverse mounting of an acoustic source in a drill collar. The details of a transversely mounted source are disclosed in copending U.S. Pat. application Ser. No. 288,742 entitled, "Method and Apparatus for Performing Acoustic Investigations", invented by Kostek et al., and assigned to Schlumberger Technology Corporation. The present application is a continuation of that application, the details of which are incorporated by reference herein.

The acoustic source of a traditional sonic wireline logging tool is mounted along a vertical central axis in the length of the tool and transmits acoustic energy at equal levels in all directions about the vertical central axis. These signals are typically transmitted through holes in the tool housing and into the formation. The traditional sonic wireline logging tool also includes a set of receivers mounted in a vertical line through the central axis of the tool housing positioned at a particular distance from the source. Such a tool is disclosed in U.S. Pat. No. 3,191,141 to Schuster, and assigned to Schlumberger Well Surveying Corporation.

The use of a traditional source in a sonic logging-while-drilling tool is not feasible because holes cannot be cut into the drill collar itself to allow the acoustic energy transmitted from the source to pass through the drill collar. There are two principle reasons for this. The first reason is that holes in the drill collar greatly reduce its mechanical integrity resulting in destruction or loss of effectiveness in the harsh drilling environment. The second reason is that mud is circulated through the drill collar to lubricate the drill bit and to allow the cuttings to flow up the collar for removal. If holes were made in the drill collar, it would disrupt or eliminate the required flow of mud. To accommodate these concerns, a transversely mounted source has been developed such that only the ends of the source are exposed through a pair of holes in opposite sides of the drill collar. A problem arises in that the signals produced by the source are not exclusively monopole in nature like those produced by a traditional sonic logging tool source. Instead, in addition to the monopole excitation mode of the acoustic signal, the transversely mounted source produces a series of excitation modes including a quadrupole, an octopole, etc which are symmetric with respect to an axial plane perpendicular to a central axis through the length of the source. Each of these excitation modes is transmitted into the formation and is recorded by the receivers.

It is desirable to process the recorded signals using traditional techniques. Such a technique is known from U.S. Pat. No. 4,594,691 to Kimball et al., and assigned to Schlumberger Technology Corporation. Traditional signal processing generally concentrates on the monopole excitation mode of the acoustic signals. Therefore, it is essential to reduce or eliminate the effects of the other modes which may interfere with the monopole mode. A receiver with the ability to reduce or eliminate the effects of the modes including the quadrupole, octopole, etc. is necessary. Such a receiver accentuates the monopole component which is essential for traditional processing techniques.

SUMMARY OF THE INVENTION

The present invention provides an apparatus for greatly reducing the effects of the quadrupole, octopole, etc. excitation modes of an acoustic signal transmitted from a transversely mounted acoustic source in a logging-while-drilling tool. As a result, the monopole mode of the acoustic signal is left intact and can be processed in accordance with traditional processing techniques.

According to one aspect of the invention, the sonic logging-while-drilling apparatus comprises a drill collar for supporting a drill bit to drill a borehole. A transmitter is mounted transversely in a first horizontal plane in the drill collar for transmitting acoustic energy into the earth formation. Finally, a receiver is mounted in a second horizontal plane on the drill collar at an angular displacement from the transmitter such that the effects of a quadrupole mode of the acoustic energy detected by the receiver are insignificant. Preferably, the receiver is situated at a 45 degree angle from the transmitter where it is unaffected by the quadrupole mode produced by the transversely mounted source.

In a second embodiment, a plurality of receivers are included in a second horizontal plane which compensate for each other by cancelling out the positive and negative portions of the quadrupole mode of the acoustic signal. Preferably, this is accomplished by situating the receivers at angles of 45, 135, 225, and 315 degrees with respect to the position of the acoustic source.

A further understanding of the nature and advantages of the invention may be realized with reference to the remaining portions of the specification and the drawings.

BRIEF DESCRIPTION OF THE DRAWINGS

FIG. 4b is a series of waveforms representing signals recorded by the receivers shown in FIG. 4a;

FIG. 5b is a series of waveforms recorded by the receivers shown in FIG. 5a;

FIG. 6b is a series of average waveforms corresponding to the signals received by the four receivers in each horizontal plane of FIG. 6a;

FIG. 7b is a series of averaged waveforms corresponding to the four receivers mounted in each horizontal plane of FIG. 7a.

DETAILED DESCRIPTION OF THE DRAWINGS

Figure 1A:
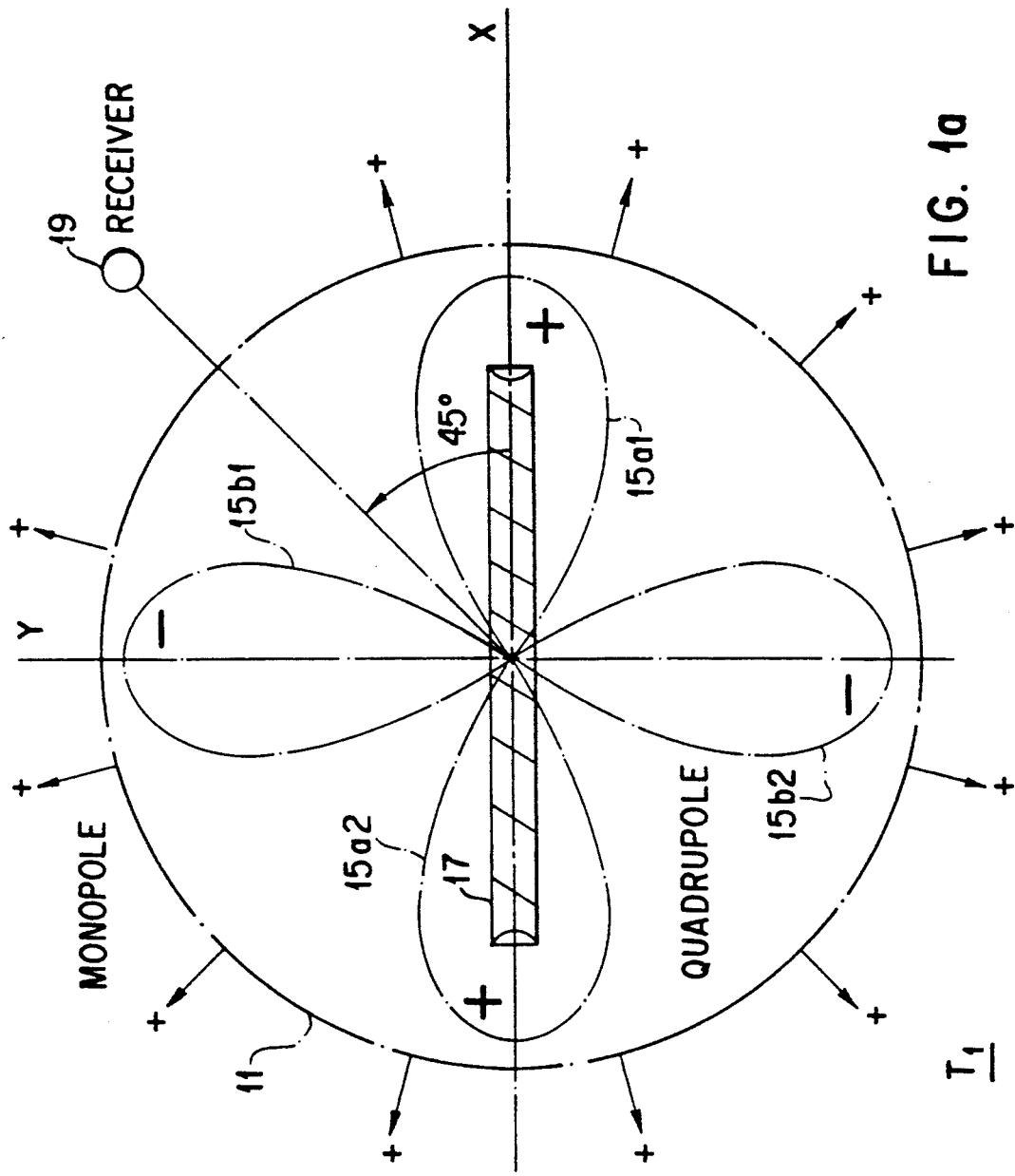
FIG. 1a is a drawing representing the monopole and quadrupole modes of an acoustic signal produced by a transversely mounted acoustic source at a first point in time.

FIG. 1a shows the various modes of the acoustic signal produced by a transversely mounted source in the drill collar of a sonic logging-while-drilling tool at a first point in time, $T_1$. A monopole mode 11 is represented by a symmetrical circle which propagates equally in all directions from a central point, in this case being the vertical axis positioned through the center of the drill collar. The movement of monopole mode 11 expands and contracts uniformly at all points around the circumference of monopole mode 11. At a first point in time, $T_1$, monopole mode 11 is expanding as indicated by the arrows and the plus signs around monopole 11. A quadrupole mode 15 includes four lobes, two of which are positive and two of which are negative. The positive lobes 15a1 and 15a2 are both symmetric about the horizontal axis (x) while negative lobes 15b1 and 15b2 are symmetric about the vertical axis (y).

Figure 1B:
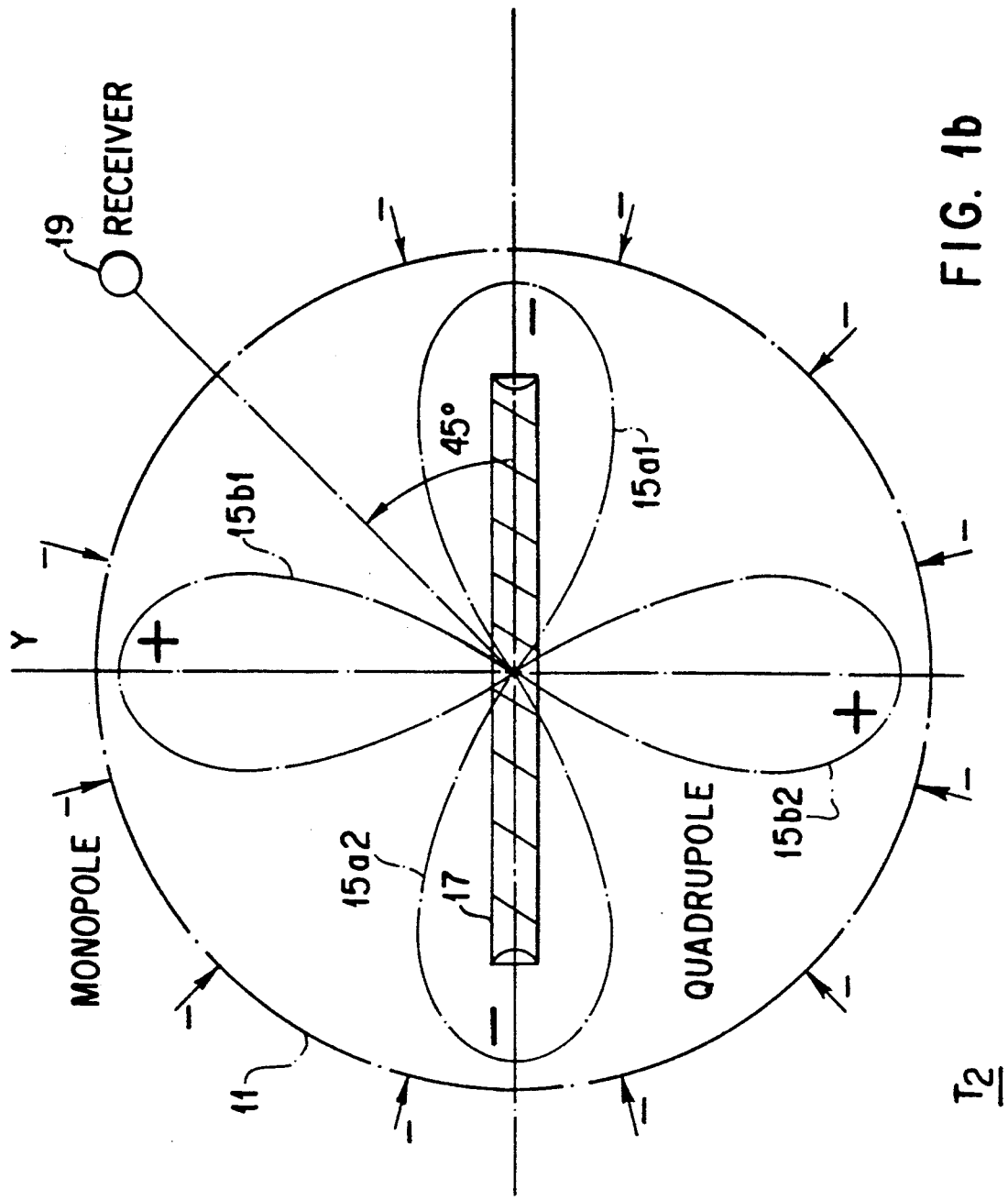
FIG. 1b is a drawing representing the monopole and quadrupole modes of an acoustic signal produced by a transversely mounted acoustic source at a second point in time.

FIG. 1b shows the same modes as those in FIG. 1a at a point in time, $T_2$. Monopole mode 11 is contracting as indicated by the arrows and the negative signs. In addition, the lobes of quadrupole 15 have reversed polarity.

A source 17 produces acoustic signals which carry the various components discussed above. In addition to monopole 11 and quadrupole 15, there is an infinite series of other modes symmetrically situated with respect to an axis perpendicular to the central axis through source 17 and including lobes of opposing polarity. However, these modes (e.g. octopole) produce increasingly weaker signals as the number of lobes increases and are less of a concern because their strength is insignificant compared to monopole 11 and quadrupole 15. In fact, if receiver 19 is placed at an appropriate vertical distance from source 17, these other modes will not reach receiver 19.

Figure 2A:
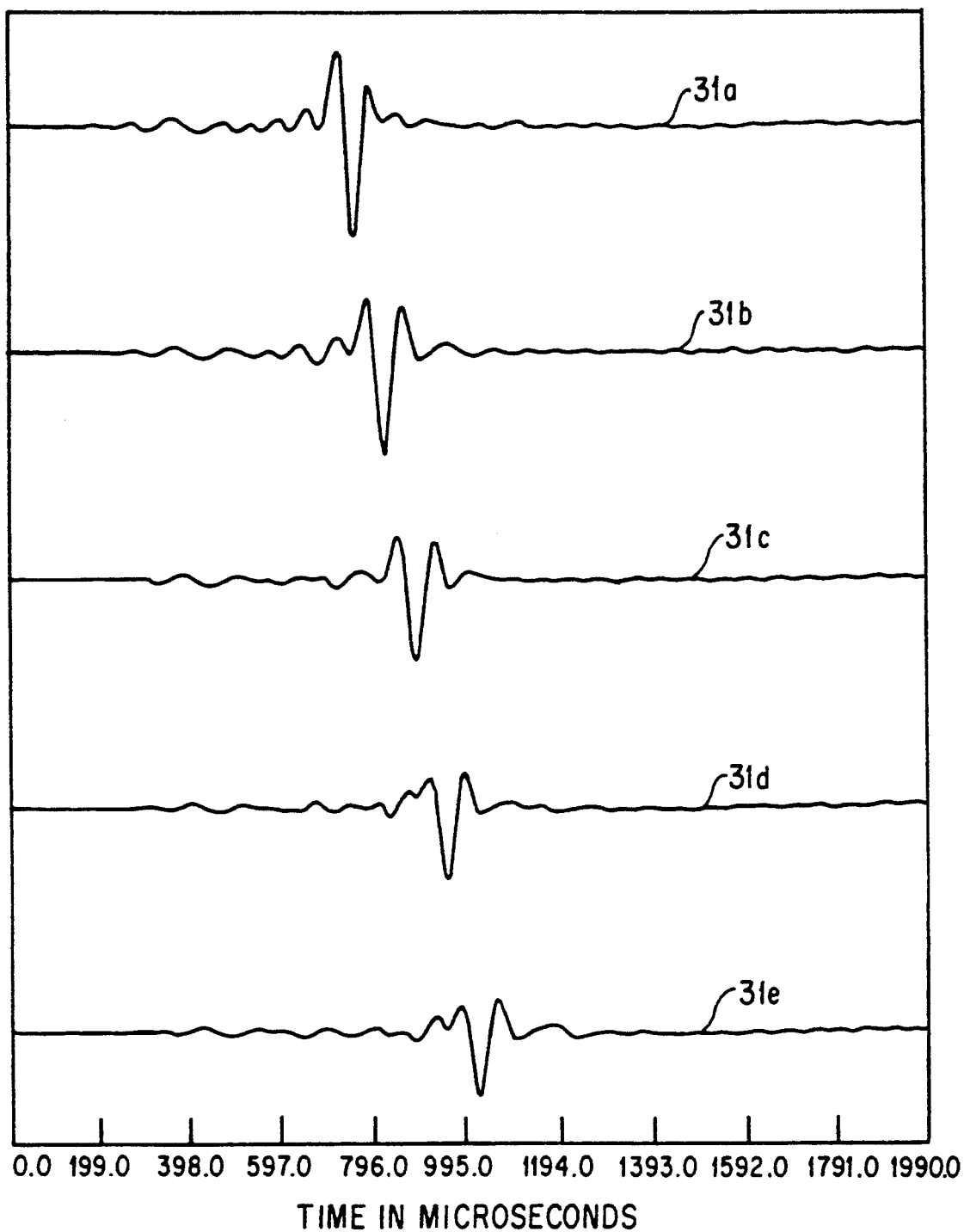
FIG. 2a represents a calculated monopole mode produced by a modelled system including a transversely mounted acoustic source and a set of receivers located in a drill collar.
Figure 2B:
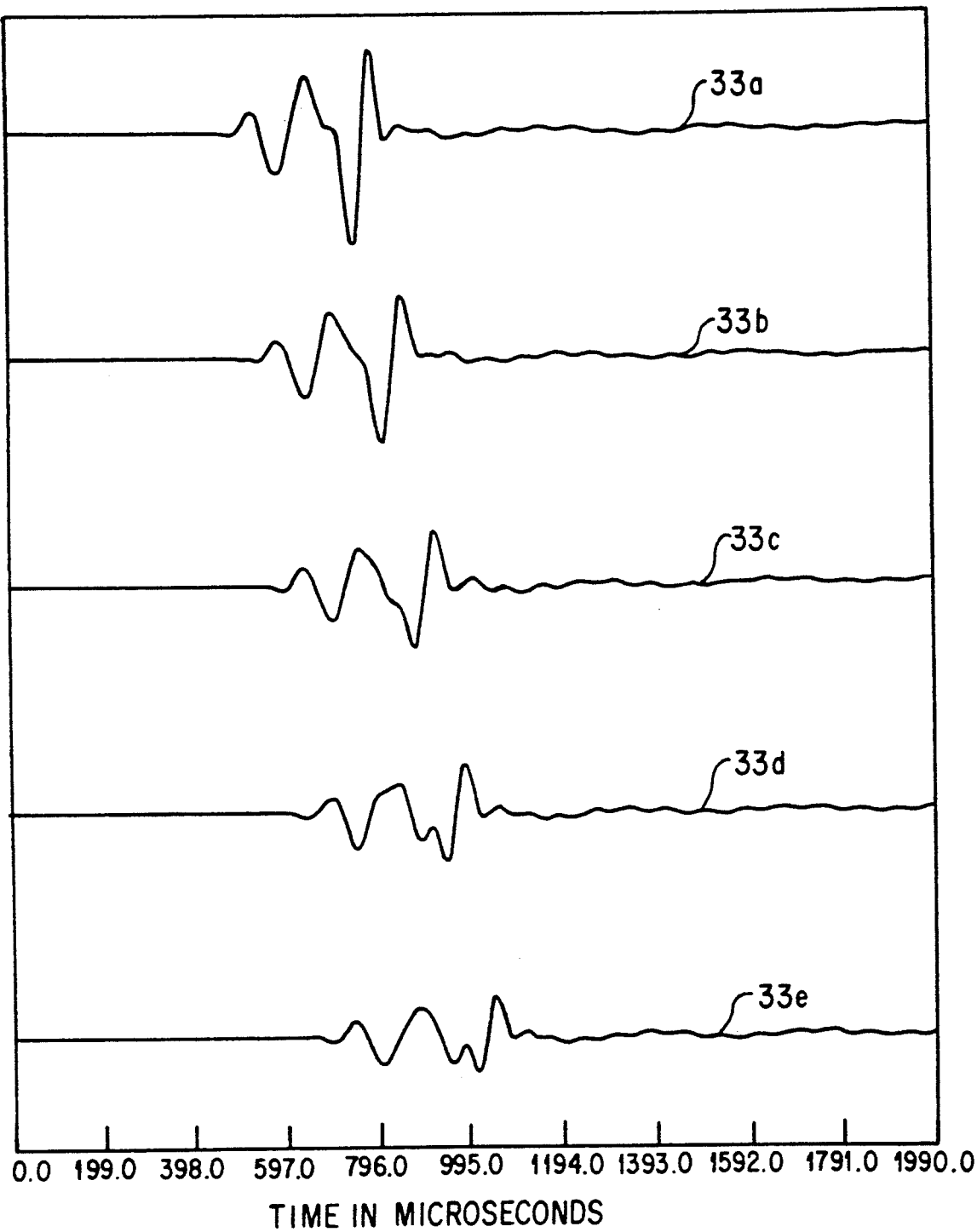
FIG. 2b represents a calculated quadrupole mode produced by a modelled system including a transversely mounted acoustic source and a set of receivers located in a drill collar.

FIG. 2a is a series of waveforms 31a through 31e representing the monopole mode calculated at five different depths in the borehole. FIG. 2b shows the quadrupole modes 33a through 33e calculated from the same modelled receivers at the same depth as those of FIG. 2a. It is clear from comparing FIGS. 2a and 2b that the quadrupole modes 33a through 33e arrive at approximately the same time at each depth as the monopole modes 31a through 31e. This makes it difficult, if not impossible, to extract the monopole mode for processing.

Figure 3:
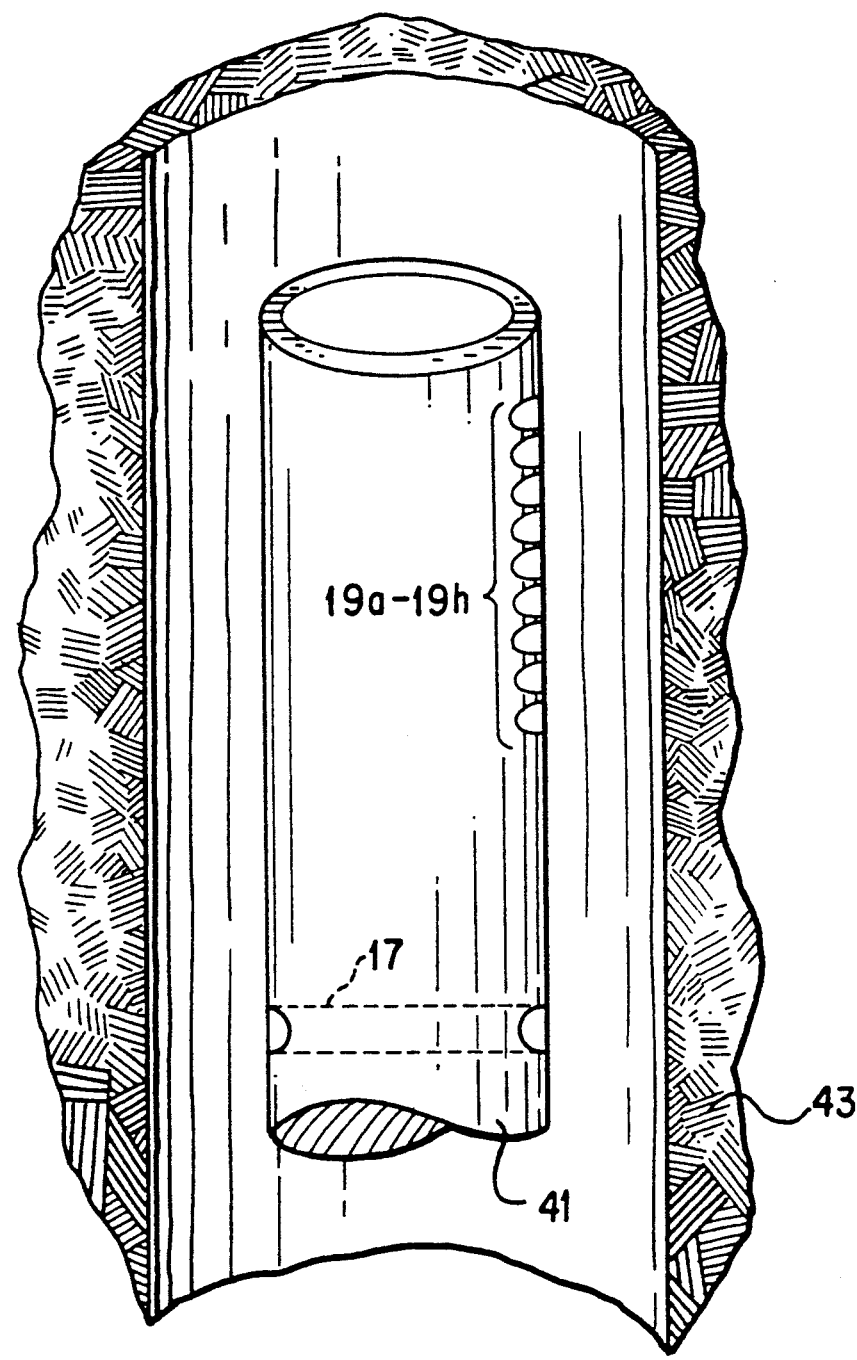
FIG. 3 is a drill collar with a transversely mounted acoustic source and a set of receivers mounted in vertical alignment along the drill collar.

FIG. 3 illustrates a side view of a portion of a drill collar 41 in an earth formation 43. Drill collar 41 includes a transversely mounted source 17 having each of its two ends exposed through the casing of drill collar 41. In addition, a series of receivers 19a through 19h are mounted in drill collar 41 at a variety of depths.

Figure 4A:
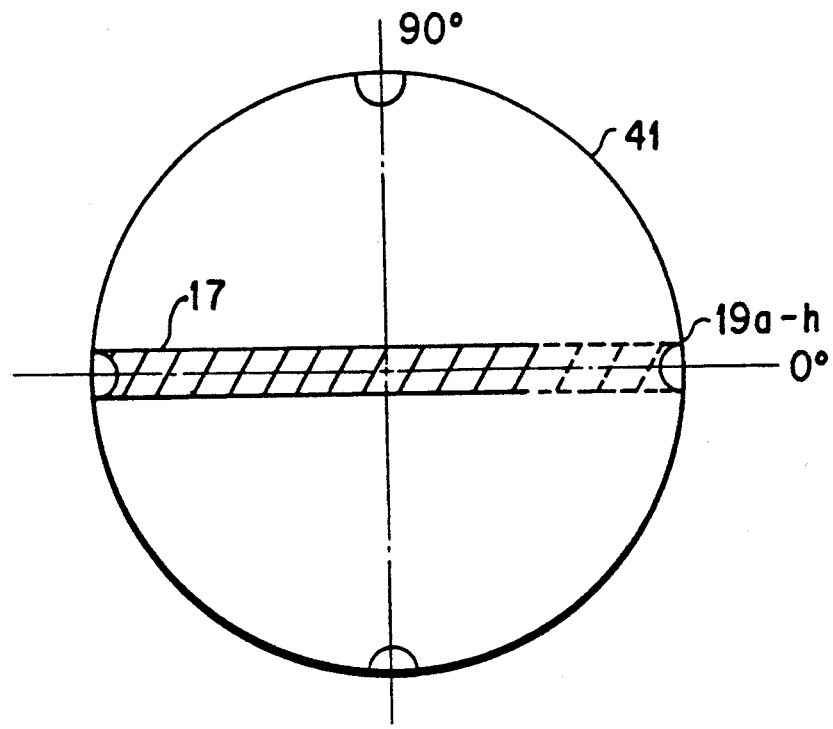
FIG. 4a is a top down view of a drill collar with a transversely mounted acoustic source and a group of receivers mounted at varying depths and in vertical alignment with the acoustic source in the drill collar.
Figure 4B:
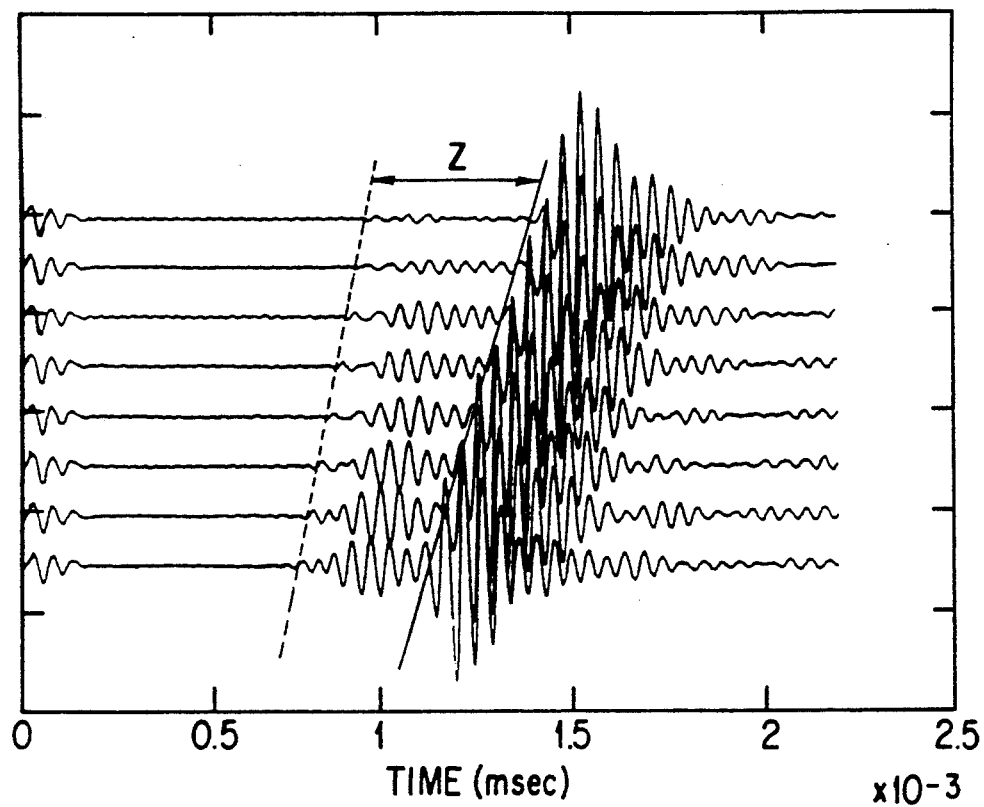

FIG. 4a is a top down view of drill collar 41. Source 17 is shown transversely mounted in drill collar 41 with its ends exposed through the casing of drill collar 41. Receivers 19a through 19h are shown positioned in vertical alignment with one end of source 17. FIG. 4b shows the corresponding waveforms recorded by receivers 19a through 19h of FIG. 4a. Time window Z of FIG. 4b contains monopole 11 and quadrupole 15 of the recorded signals for each of receivers 19a through 19h. In this case, with a single receiver at each depth in vertical alignment with source 17, monopole 11 and quadrupole 15 are intermingled and cannot be separated.

Figure 5A:
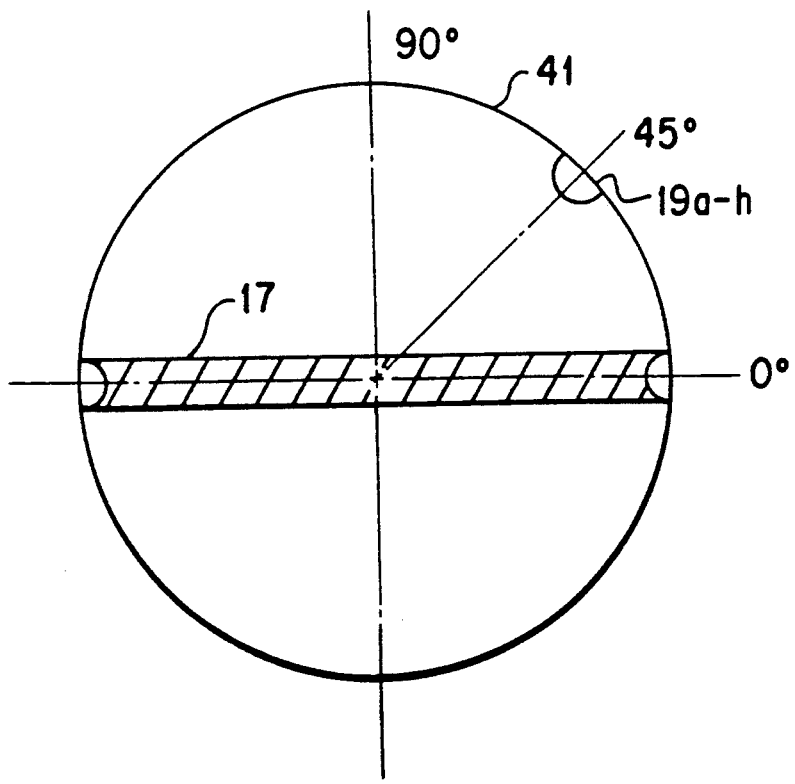
FIG. 5a is a top down view of a drill collar with a transversely mounted acoustic source and a group of receivers mounted at varying depths and at 45 degrees to the acoustic source.
Figure 5B:
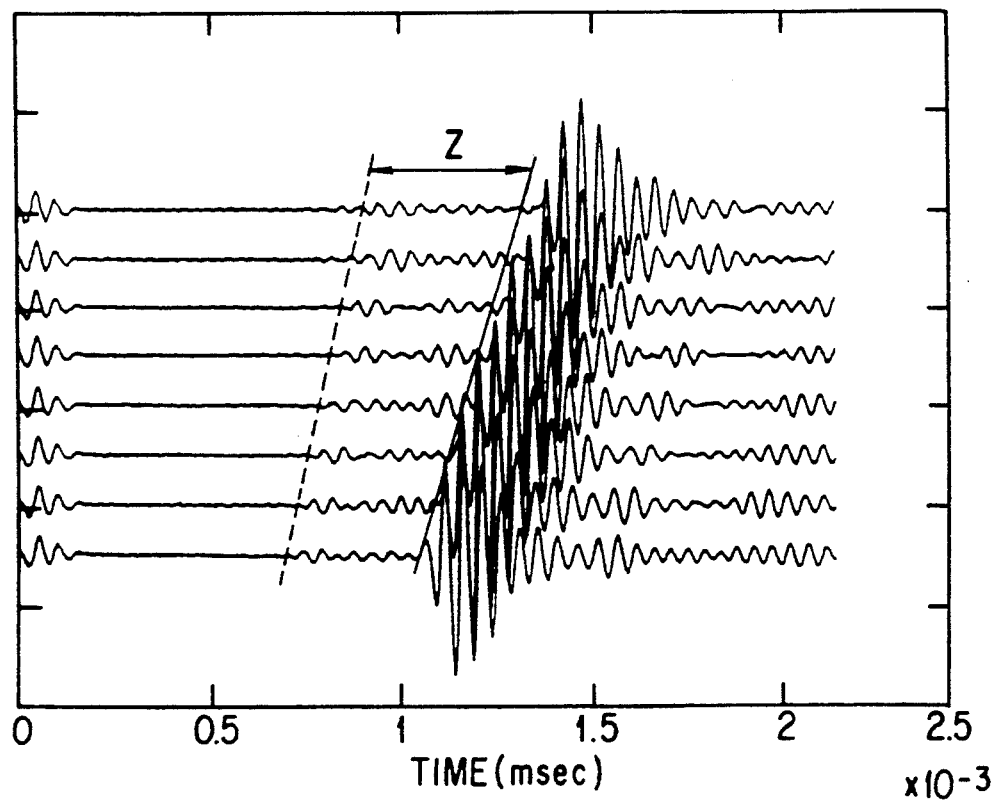

In contrast to the configuration shown in FIG. 4, the configuration of FIG. 5 reduces the effects of quadrupole 15 to provide a clearer image of monopole 11. Receivers 19a through 19h are angularly displaced from source 17 by 45 degrees to prevent receivers 19a through 19h from sensing quadrupole 15. Referring to FIG. 1, the reason for this result becomes clear. The lobes created by quadrupole 15 are centered on the x and y-axes. If receivers 19a through 19h are positioned at 45 degrees from the x-axis, quadrupole lobes 15a and 15b do not interfere with monopole mode 11. It should be noted that an octopole mode (not shown) as well as other higher order modes may be present along the 45 degree line. However, these signals are much weaker than quadrupole mode 15 and do not affect monopole 11 to a measurable degree. Therefore, positioning receivers 19a through 19h on the 45 degree line provides a clear image of monopole 11. Referring to FIG. 5b, it can be seen that quadrupole 15 is greatly reduced within time window Z as compared to FIG. 4b.

Figure 6A:
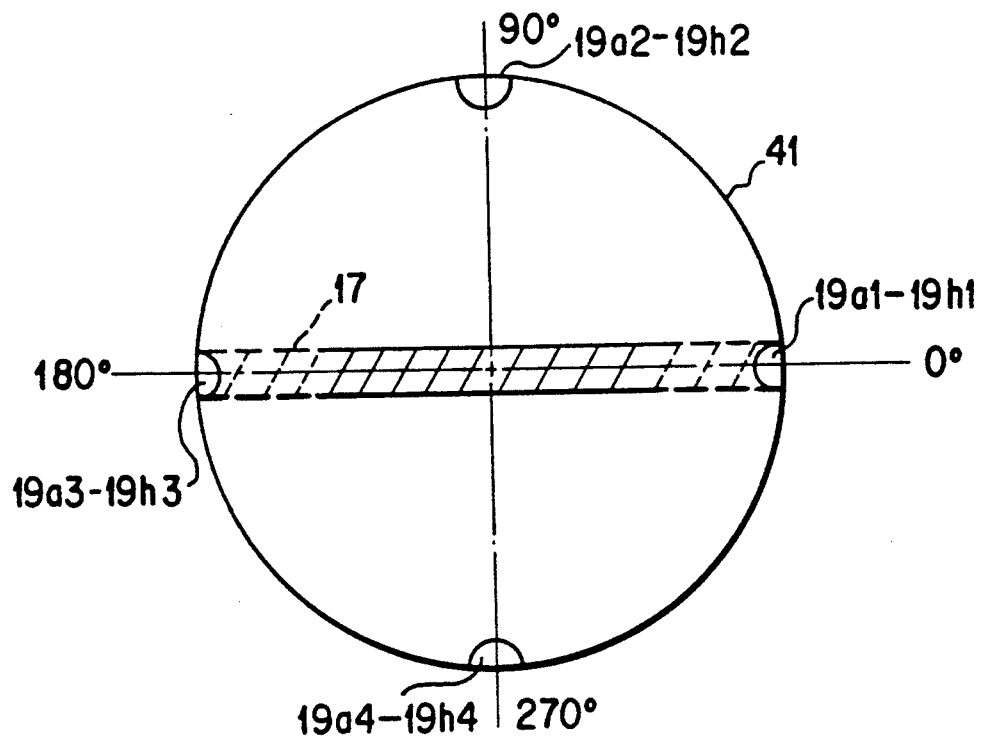
FIG. 6a is a top down view of a drill collar with a transversely mounted acoustic source and four sets of receivers mounted at varying depths and at 0, 90, 180, and 270 degrees respectively with respect to the acoustic source.

An alternative embodiment of the present invention is shown in FIG. 6a. In this embodiment, four receivers are mounted in drill collar 41 at each depth. For example, at a first depth, receivers 19a1, 19a2, 19a3, and 19a4, are positioned at equal angular displacements around the circumference of drill collar 41. In FIG. 6a, these positions are at 0, 90, 180, and 270 degrees respectively. The signals of the four receivers positioned at each depth are combined and a single resulting signal is obtained for each depth. For receiver sets 19a through 19h, these signals are averaged and shown in FIG. 6b. Alternatively, the signal may be summed. In either case, processing is performed on the resulting signals.

Figure 6B:
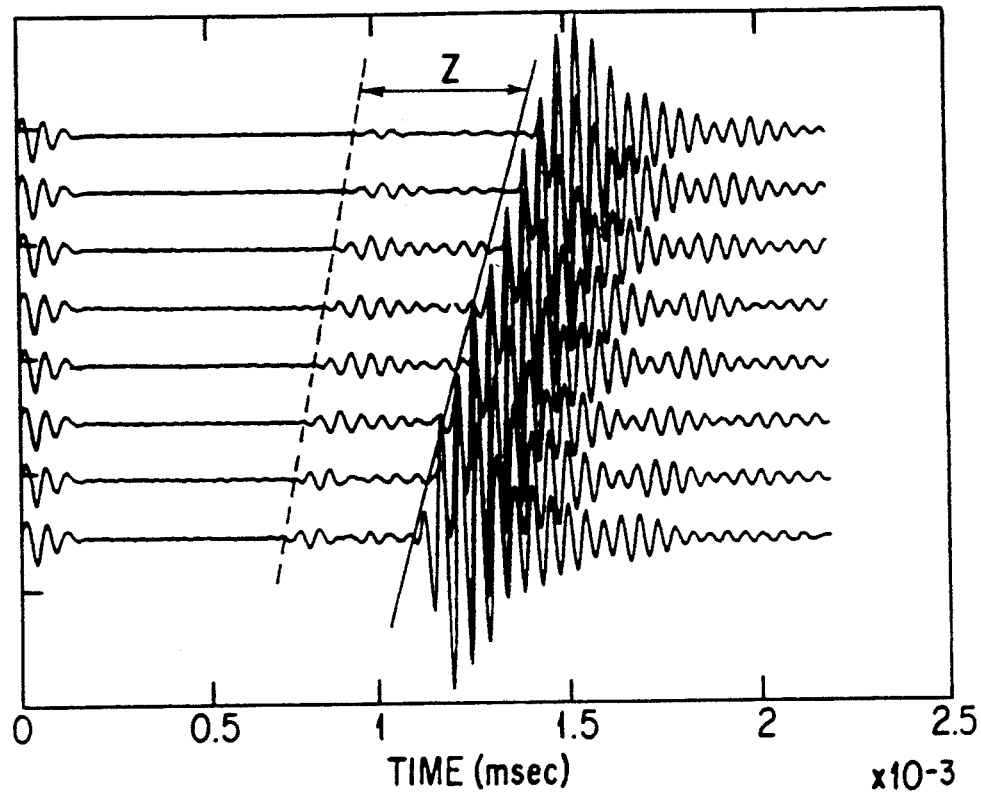

The waveform shown in FIG. 6b shows that quadrupole mode 15 is reduced in comparison to the configuration of FIG. 4a where only a single receiver was used at each depth. The reason that the averaging technique implemented in the configuration of FIG. 6a using four receivers provides better results than the single receiver per depth configuration of FIG. 4a, is that receivers occupying positions 90 degrees from each other tend to cancel the oppositely polarized lobes of quadrupole 15.

For example, receiver 19a1, positioned at positive lobe 15a of quadrupole mode 15 cancels the opposing effect recorded by receiver 19a2 positioned at negative lobe 15b1 of quadrupole mode 15. Similarly, receiver 19a3 situated at lobe 15a2 cancels the effects of oppositely polarized quadrupole lobe 15b2 detected by receiver 19a4.

Figure 7A:
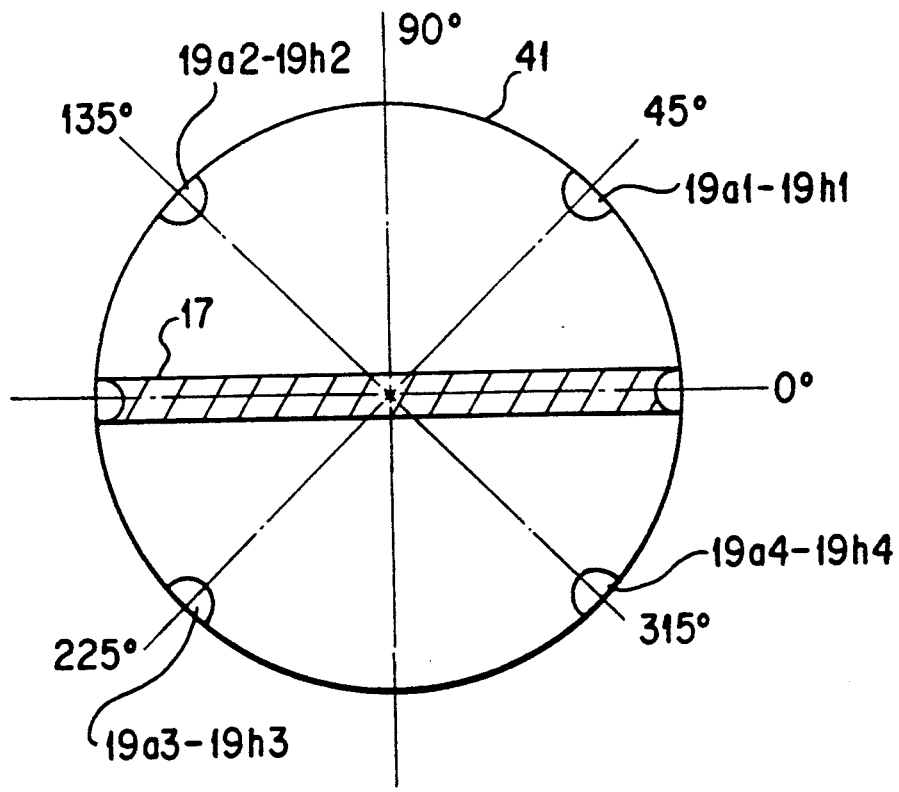
FIG. 7a is a top down view of a drill collar including a transversely mounted acoustic source and four sets of receivers mounted at varying depths and at 45, 135, 225, and 315 degrees with respect to the acoustic source.
Figure 7B:
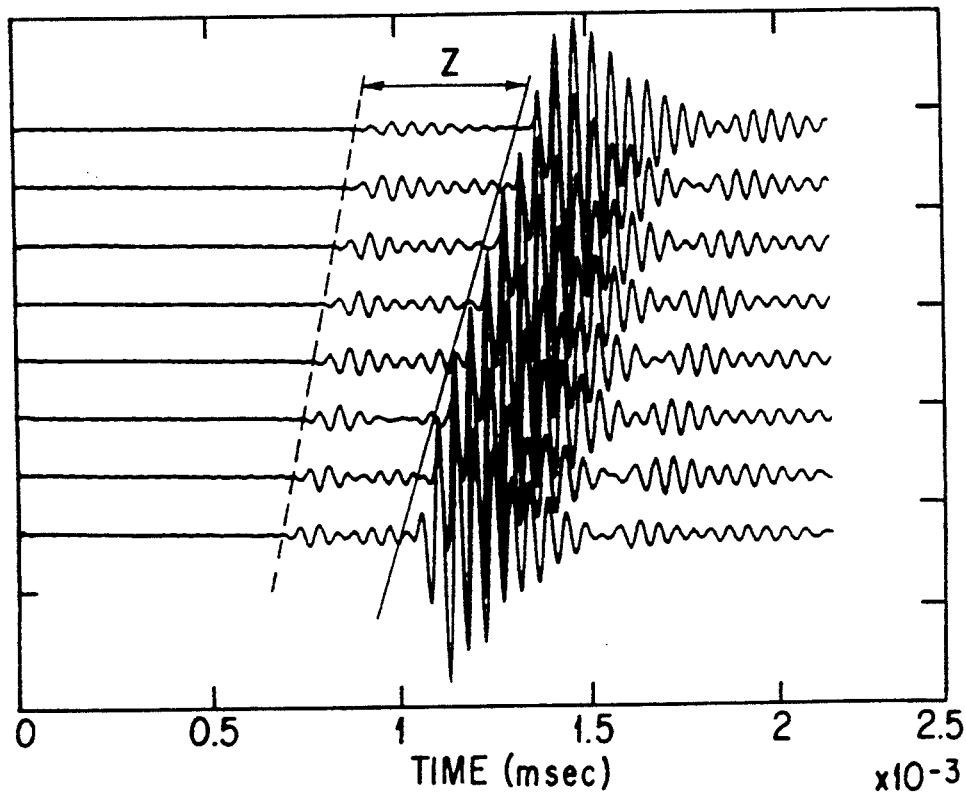

Another alternative embodiment is shown in FIG. 7a. In this case, the receivers of FIG. 6a are rotated by 45 degrees. This reduces the recorded effects of quadrupole 15 by moving the receivers off of the axis containing the lobe components as well as maintaining compensation of opposite polarities between receivers. As can be seen in FIG. 7b, the results obtained in time window Z are minimally effected by quadrupole 15.

In conclusion, the present invention reduces or eliminates the quadrupole modes from the acoustic signal recorded at the receivers. A clear monopole image is provided which may be processed in accordance with traditional techniques. While the above is a complete description of the preferred embodiments of the invention, various alternatives, modifications, and equivalents may be used. For example, it is possible to use two receivers at each depth in FIGS. 6a and 7a instead of four. These receivers should be positioned at an angular displacement off of the horizontal axis through source 17, and 90 degrees from each other. Referring to FIG. 7a, only the receivers at 45 and 135 degrees would be used: 19a1-19h1 and 19a2-19h2. Therefore, the above description should not be taken as limiting the scope of the invention which is defined by the appended claims.

What is claimed:

1. An apparatus for obtaining sonic logging while drilling a borehole traversing an earth formation, comprising:
    a drill collar for supporting a drill bit to drill the borehole, said drill collar having a central axis;
    a transmitter having a first end and a second end, transversely mounted in said drill collar a first horizontal plane perpendicular to said central axis for transmitting acoustic energy into the earth formation; and
    a first plurality of receivers mounted in said drill collar in second horizontal plane perpendicular to said central axis wherein said receivers are positioned substantially equal distances apart from each other about the exterior of said drill collar.

2. The apparatus of claim 1 wherein the first plurality of receivers includes an even number of receivers.

3. The apparatus of claim 2 wherein the first plurality of receivers includes four receivers mounted at angular positions in said drill collar of 0, 90, 180, and 270 degrees with respect to a point on said drill collar.

4. The apparatus of claim 3 wherein said first end of said transmitter is mounted in said drill collar at one of either 0, 90, 180, or 270 degrees with respect to said point.

5. The apparatus of claim 3 further including at least one additional plurality of receivers mounted in corresponding horizontal planes in said drill collar in vertical alignment with said first plurality of receivers.

6. The apparatus of claim 2 wherein the first plurality of receivers includes four receivers mounted at angular positions in said drill collar of 45, 135, 225, and 315 degrees with respect to a point on said drill collar.

7. The apparatus of claim 6 wherein said first end of said transmitter is mounted in said drill collar at one of either 0, 90, 180, or 270 degrees with respect to said point.

8. The apparatus of claim 6 further including at least one additional plurality of receivers mounted in corresponding horizontal planes in said drill collar in vertical alignment with said first plurality of receivers.

9. The apparatus of claim 2 wherein the first plurality of receivers includes two receivers mounted at angular positions in said drill collar of 0 and 90 degrees with respect to a point on said drill collar.

10. The apparatus of claim 9 wherein said transmitter is mounted in said drill collar at one of either 0, 90, 180, or 270 degrees with respect to said point.

11. The apparatus of claim 9 further including at least one additional plurality of receivers mounted in corresponding horizontal planes in said drill collar in vertical alignment with said first plurality of receivers.

12. The apparatus of claim 2 wherein the first plurality of receivers includes two receivers mounted at angular positions in said drill collar of 45 and 135 degrees with respect to a point on said drill collar.

13. The apparatus of claim 12 wherein said first end of said transmitter is mounted in said drill collar at one of either 0, 90, 180, or 270 degrees with respect to said point.

14. The apparatus of claim 12 further including at least one additional plurality of receivers mounted in corresponding horizontal planes in said drill collar in vertical alignment with said first plurality of receivers.

15. The apparatus of claim 1 wherein individual signals received by said plurality of receivers are combined to obtain a single resulting signal.

16. The apparatus of claim 15 wherein said resulting signal is obtained by summing said individual signals.

17. The apparatus of claim 15 wherein said resulting signal is obtained by averaging said individual signals.

18. An apparatus for obtaining sonic logging while drilling a borehole traversing an earth formation, comprising:
    a drill collar for supporting a drill bit to drill the borehole, said drill collar having a central axis;
    a transmitter having a first end and a second end mounted transversely in said drill collar in a first horizontal plane perpendicular to said central axis for transmitting acoustic energy into the earth formation; and
    a receiver mounted in said drill collar at a second horizontal plane perpendicular to said central axis in said drill collar at an angular displacement from said transmitter such that the effects of a quadrupole component of said acoustic energy detected by said receiver are insignificant.

19. The apparatus of claim 18 wherein said angular displacement between said transmitter and said receiver is 45 degrees.

20. The apparatus of claim 18 further including at least one additional receiver mounted in corresponding horizontal planes in said drill collar in vertical alignment with said first receiver.

* * * * *